United States Patent
Lee

(10) Patent No.: US 8,129,885 B2
(45) Date of Patent: Mar. 6, 2012

(54) ELECTRIC GENERATING UNIT AS SUBSTITUTE FOR VEHICLE BATTERY

(75) Inventor: Yong Sung Lee, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 523 days.

(21) Appl. No.: 12/357,997

(22) Filed: Jan. 22, 2009

(65) Prior Publication Data
US 2009/0284103 A1 Nov. 19, 2009

(30) Foreign Application Priority Data
May 15, 2008 (KR) .................. 10-2008-0045114

(51) Int. Cl.
H01L 41/113 (2006.01)
H02N 2/18 (2006.01)
H04R 17/00 (2006.01)

(52) U.S. Cl. ......... 310/329; 322/2 R; 381/190; 310/324; 310/339

(58) Field of Classification Search ........... 310/328–329
See application file for complete search history.

(56) References Cited

U.S. PATENT DOCUMENTS

| 3,360,664 | A | * | 12/1967 | Straube | 310/330 |
| 4,079,213 | A | * | 3/1978 | Bage et al. | 381/163 |
| 4,654,554 | A | * | 3/1987 | Kishi | 381/190 |
| 5,251,264 | A | * | 10/1993 | Tichy | 381/173 |
| 5,856,956 | A | * | 1/1999 | Toki | 367/160 |
| 2007/0001551 | A1 | * | 1/2007 | Izumi et al. | 310/328 |
| 2007/0177747 | A1 | * | 8/2007 | Onishi et al. | 381/190 |
| 2007/0243084 | A1 | * | 10/2007 | Vogeley | 417/413.2 |

FOREIGN PATENT DOCUMENTS
JP 2007-13509 A 1/2007
* cited by examiner

*Primary Examiner* — Burton Mullins
(74) *Attorney, Agent, or Firm* — Morgan, Lewis & Bockius LLP

(57) ABSTRACT

An electric generating unit as a substitute for a vehicle battery includes a housing including an air pressure control member to control air pressure in an inner space of the housing, at least a diaphragm unit configured to sufficiently fluidly-insulate the inner space of the housing from outside of the housing and flexibly deformable by an inertia applied by a mass unit according to an external force so as to generate electricity, wherein the mass unit is formed on the diaphragm unit.

18 Claims, 5 Drawing Sheets

FIG. 1 *(Prior Art)*

FIG. 2
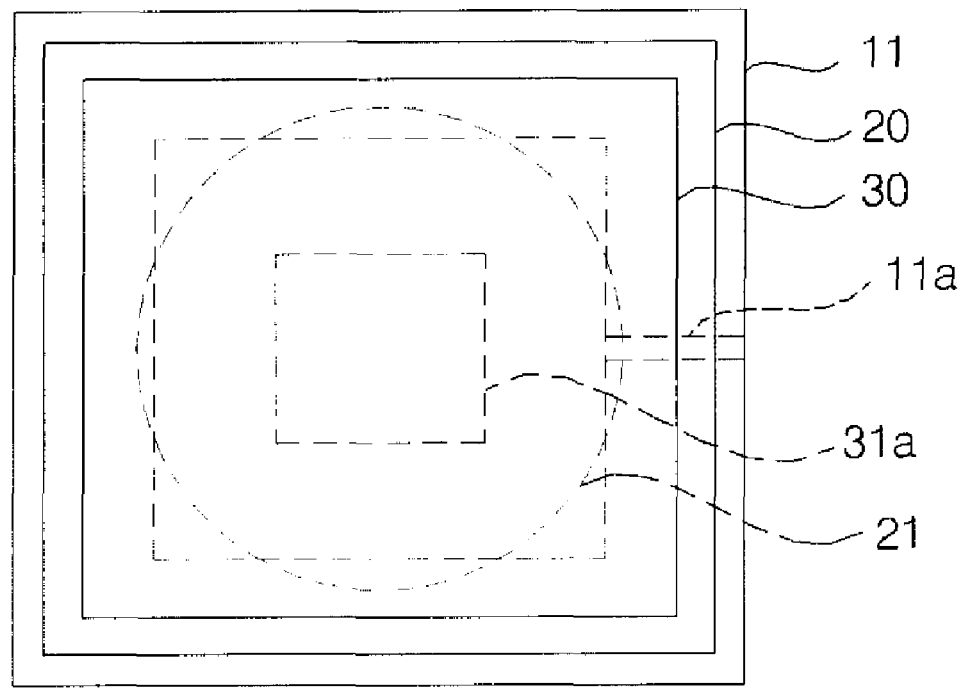
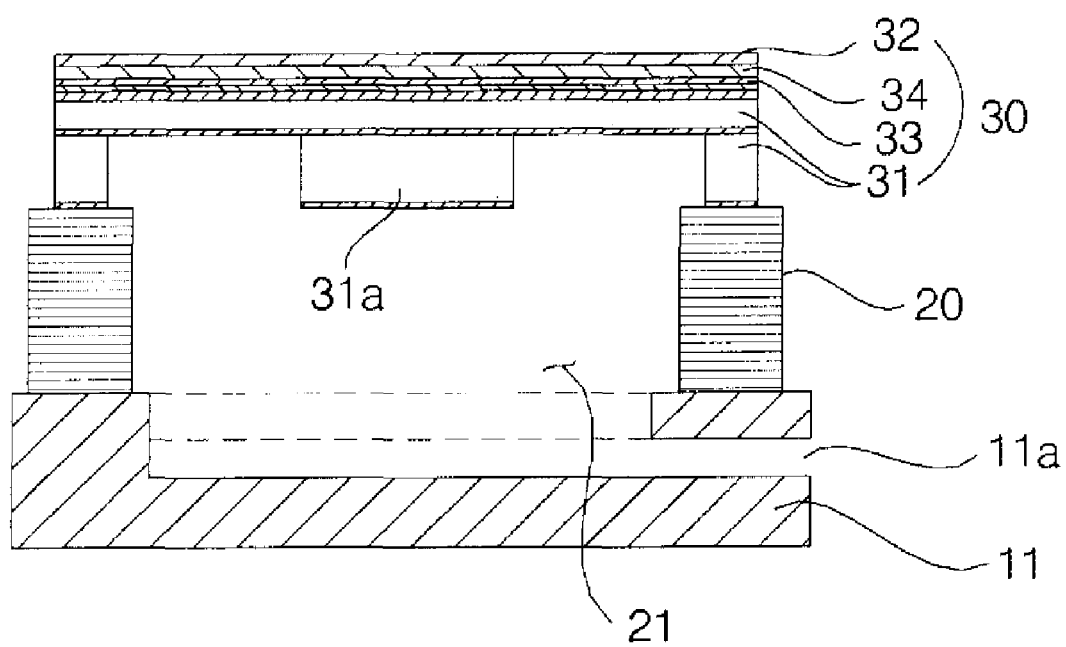

ELECTRIC GENERATING UNIT AS SUBSTITUTE FOR VEHICLE BATTERY

CROSS-REFERENCE TO RELATED APPLICATION

The present application claims priority to Korean Patent Application Number 10-2008-0045114 filed May 15, 2008, the entire contents of which application is incorporated herein for all purposes by this reference.

BACKGROUND OF THE INVENTION

1. Field of the Invention

The present invention relates to an electric generating unit as a substitute for a vehicle battery and, more particularly, to an electric generating unit as a substitute for a vehicle battery, which is independently provided for the operation of an electronic device for a tire pressure monitoring system (TPMS), for example, which is newly governed by laws and regulations.

2. Description of Related Art

In general, an automobile is equipped with electronic devices and requires power supply to drive these electronic devices. Recently, since the application of electronic devices to the automobile is rapidly increased, the quantity of electric wires for the power supply to the electronic devices is also increased. For example, a tire pressure monitoring system (TPMS) is governed by laws and regulations, and a power generating device capable of generating electrical energy by external vibration or pressure is provided to operate the TPMS.

FIG. 1 is a diagram illustrating a concept of generating electricity in a conventional piezoelectric generating apparatus in accordance with a conventional art, in which a steel ball beats piezoelectric ceramics plates disposed on both sides thereof by external vibration.

Referring to FIG. 1, piezoelectric ceramics plates 1 are disposed on both sides of a cylindrical container closed at both ends and, when a steel ball 4 beats these piezoelectric ceramics plates 1, electricity is generated. A buffer plate 3 is attached on one sidewall of the container 8 using an adhesive 6, and one piezoelectric ceramics plate 1 is attached to only the center of the buffer plate 3 using the adhesive 5. Same as above, the other piezoelectric ceramics plate 1 is attached on the other sidewall of the container 8, and thereby the piezoelectric ceramics plates 1 face each other. A protective plate 2 is fixed at the center of each of the piezoelectric ceramics plates 1 facing each other. A pipe 7 is arranged between both of the piezoelectric ceramics plates 1, and the steel ball 4 which can roll freely is provided in the pipe 7.

The piezoelectric ceramics plate 1 is formed by joining two plate-like piezoelectric ceramics elements 1a and 1b having the same shape (same material and same thickness) with inverted polarity of the dielectric polarization. Since the piezoelectric ceramics elements 1a and 1b formed in the same manner are joined to each other, a flexural vibration is caused on the junction surface as the central point (position where it does not expand and contract). In this case, if the ceramics element 1a on one surface expands, the ceramics element 1a on the other surface contracts, and the polarities of output voltages are the same direction. The two piezoelectric ceramics elements 1a and 1b are connected in series in the electricity generation structure.

When the flexural vibration is generated centering on the junction surface, both operations of expansion and contraction are performed on one piezoelectric ceramics element 1a or 1b and the generation of electricity is effectively performed without cancellation of the polarization. The current generated as electrical energy is obtained through lead wires 9.

In this case, the two piezoelectric ceramics elements 1a and 1b are stacked; however, each piezoelectric ceramics element 1a or 1b can be formed in a stacked manner. In this stacked structure, a plurality of thin piezoelectric ceramics plates (in this case, polarities of the polarization are the same) are joined and stacked, and thereby one piezoelectric ceramics element 1a or 1b is formed.

The reason that the piezoelectric ceramics plate 1 is fixed to the center of the buffer plate 3 using the adhesive 5 is to prevent the vibration of the piezoelectric ceramics plate 1 from decreasing. When the piezoelectric ceramics plate 1 vibrates, a member supporting the piezoelectric ceramics plate 1 is a factor of reducing the vibration of the piezoelectric ceramics plate 1. To remove the factor of reducing the vibration, the piezoelectric ceramics plate 1 is in a free state using the buffer plate 3.

Since a natural vibration of the piezoelectric ceramics plate 1 is maintained for a long time by using the buffer plate 3, the efficiency of electricity generation is improved. The buffer plate 3 also absorbs the impact applied to the piezoelectric ceramics plate 1. The protective plate 2 is made of metal, synthetic resin, or the like, and it protects the piezoelectric ceramics plate 1 from the beating of the steel ball 4.

If the piezoelectric generating apparatus is arranged under predetermined motional conditions that utilize wind, wave or human action, the steel ball 4 rolls up and down and beats the right and left piezoelectric ceramics plates 1 so as to apply impact energy by the collision. Then, the vibration is generated on the piezoelectric ceramics plates 1, the piezoelectric ceramics plates 1 repeatedly expand and contract, and therefore the piezoelectric ceramics plates 1 generate alternating current electricity.

The above-described piezoelectric generating apparatus can generate large energy with a relative small force; however, the performance is significantly reduced by high frequency vibration and, especially, abrasion occurs in the region where the steel ball beats, which affects the durability. Moreover, concave and convex portions are formed by contaminants on the inside surface of the pipe, where the steel ball moves, thus obstructing the movement of the steel ball.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a small-sized electric generating unit having excellent durability, in which a diaphragm including a piezoelectric element is provided to generate electricity by the action of mechanical stress using external vibration, pressure, or acoustic energy. The electric generating unit can be used as a substitute for a vehicle battery and thus used for the operation of an electronic device for a tire pressure monitoring system (TPMS), for example, disposed on the outside such as a tire, and thereby it is possible to solve the problem that the battery should be replaced periodically.

In an aspect of the present invention, an electric generating unit as a substitute for a vehicle battery includes a housing including an air pressure control member to control air pressure in an inner space of the housing, at least a diaphragm unit configured to sufficiently fluidly-insulate the inner space of the housing from outside of the housing and flexibly deformable by an inertia applied by a mass unit according to an external force so as to generate electricity, wherein the mass unit is formed on the diaphragm unit.

A sound absorbing plate may be formed between the diaphragm units to absorb external acoustic energy.

The mass unit may be integrally formed with the diaphragm unit.

The size and thickness of the mass unit may be adjusted according to resonant frequency of the diaphragm unit.

The air pressure control member may include at least a vent hole formed to the housing and configured to fluidly communicate the inner space with the outside of the housing to control the air pressure in the inner space so as to prevent generation of excessive amplitude of the diaphragm unit and improve durability.

In another aspect of the present invention, the electric generating unit may further include a power conversion device converting a current generated from the diaphragm unit and storing the converted current, wherein the power conversion device includes power terminals connected to the power conversion device.

The diaphragm unit may include a silicon wafer being supported by a fixed wafer formed in the housing, wherein the mass unit is formed substantially on center of the silicon wafer, upper and lower electrodes provided at top of the silicon wafer, and a piezoelectric element disposed between the upper and lower electrodes and configured to generate electricity by mechanical stress occurring from the flexible deformation of the piezoelectric element.

The piezoelectric element may include PZT(Pb(Ti,Zr)O3) with a Zr Tr composition ratio of approximately 52 approximately 48.

The upper and lower electrodes may be made of a platinum, gold, copper, or aluminum.

The fixed wafer may have hardness higher than that of the silicon wafer.

The fixed wafer may be made of quartz glass or silicon material.

A silicon oxide layer may be formed on upper and lower surfaces of the silicon wafer and configured to be removed after a predetermined time period of etching.

An intermediate layer may be formed between the silicon oxide layer and one of the upper or lower electrode, wherein the intermediate layer is made of titanium or chrome.

The mass unit may be formed by backside etching during processing of the silicon wafer.

The housing may include an lower housing on which the fixed wafer and the diaphragm unit are placed, an upper housing connected to the lower housing and covering top portion of the diaphragm unit, and a power conversion device converting a current generated from the diaphragm unit and storing the converted current.

The vent hole may be disposed at the lower housing.

A sound absorbing plate may be formed between the diaphragm units and formed integrally with the upper housing to absorb external acoustic energy.

The power conversion device may be formed integrally with the lower housing and includes power terminals connected to the power conversion device.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 2 and 3 are schematic diagrams showing an exemplary electric generating unit as a substitute for a vehicle battery in accordance with the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
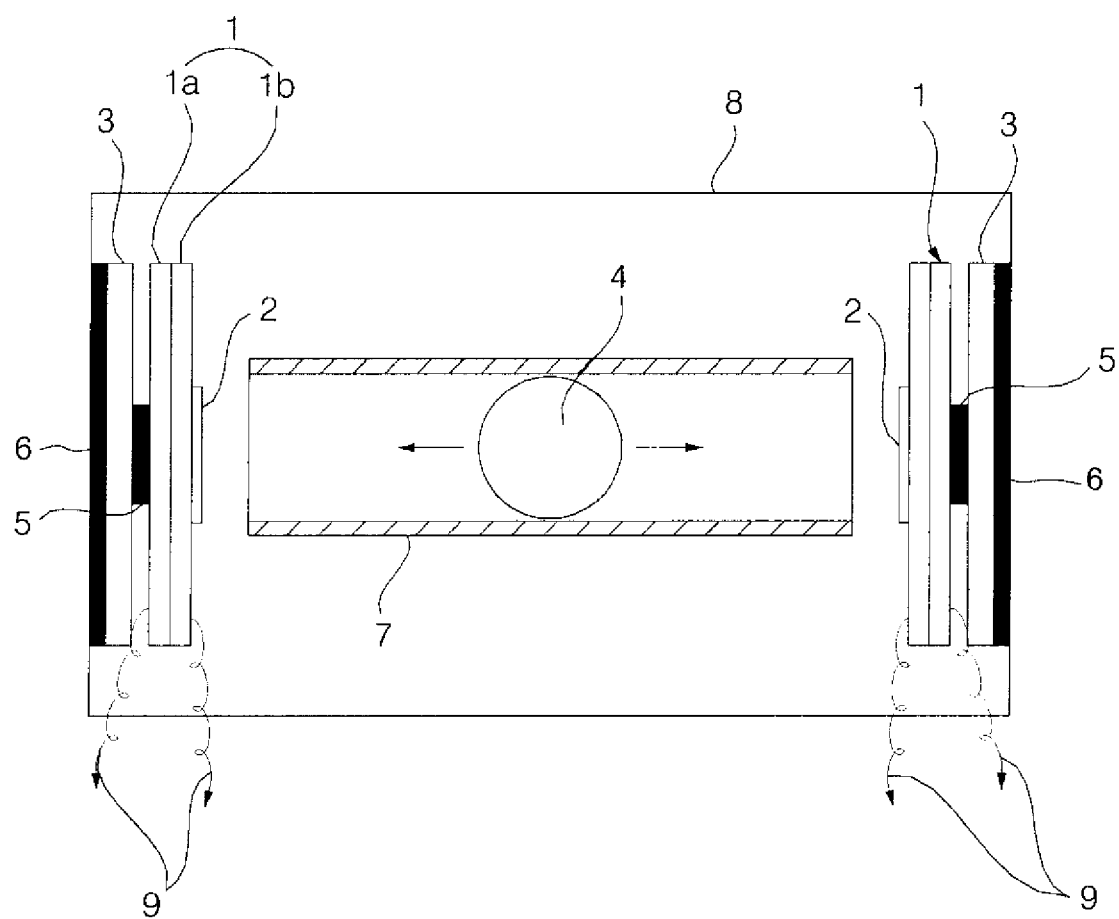
FIG. 1 is a schematic diagram illustrating a concept of generating electricity in a conventional piezoelectric generating apparatus, in which a steel ball beats piezoelectric ceramics plates disposed on both sides thereof by external vibration.
Figure 3:
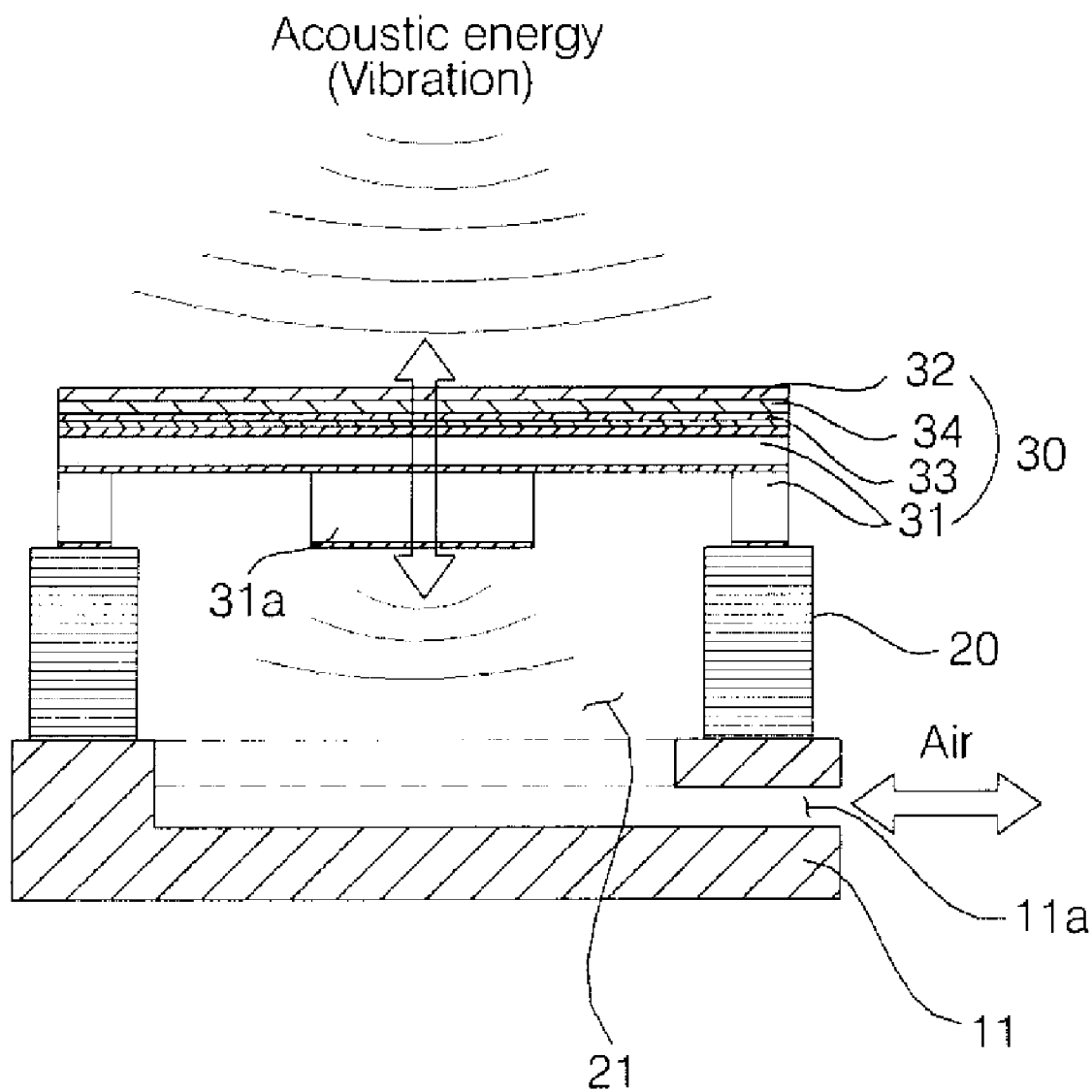
Figure 4:
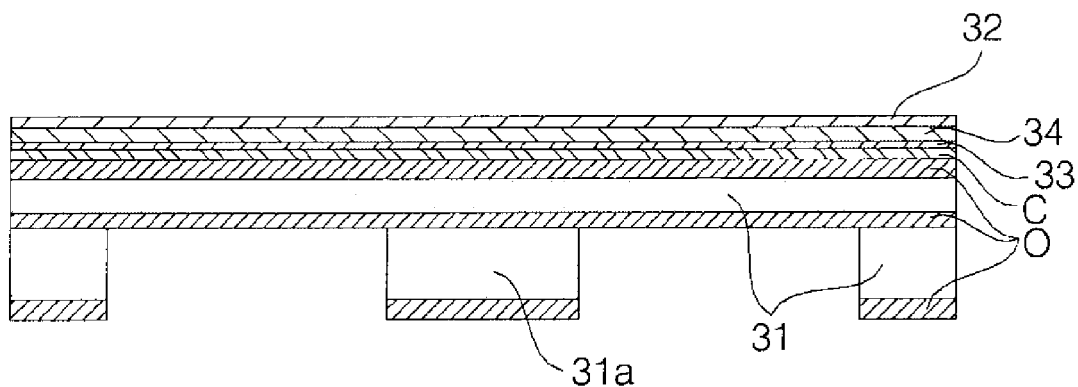
FIG. 4 is a schematic diagram showing an exemplary structure of a diaphragm of the electric generating unit in accordance with the present invention.
Figure 5:
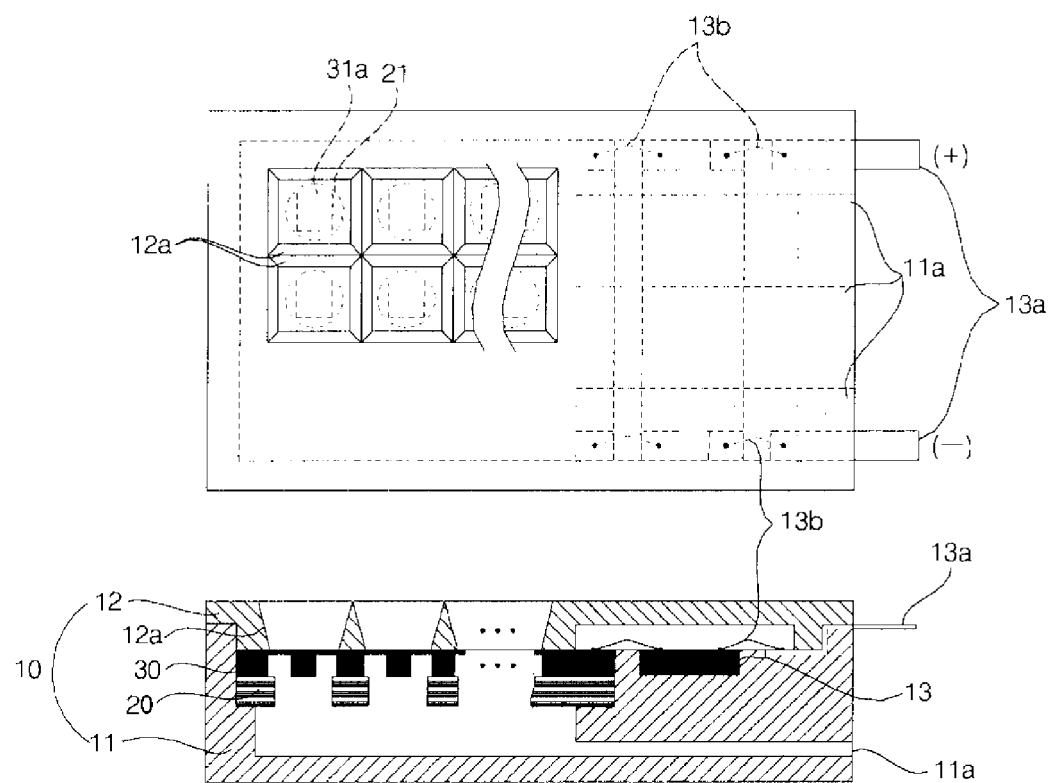
FIG. 5 is a schematic diagram showing an exemplary overall structure of the electric generating unit in accordance with the present invention.
Figure 6:
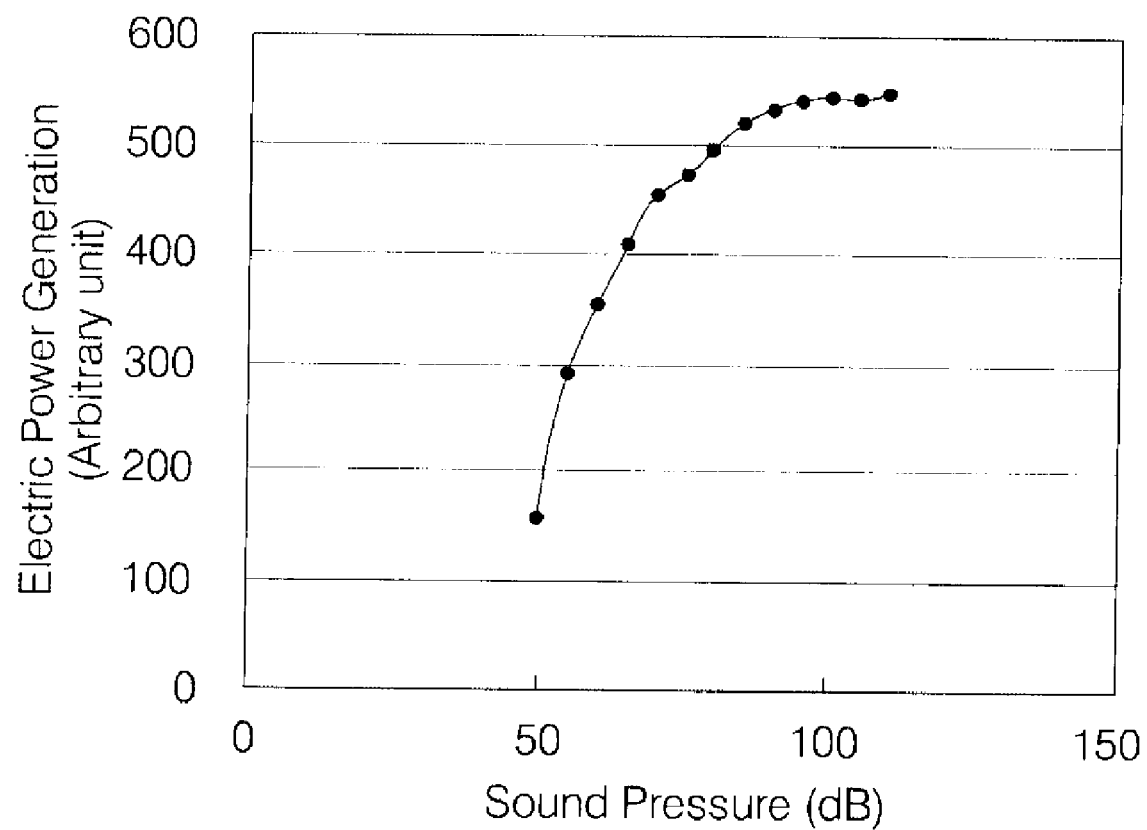
FIG. 6 is a graph showing an exemplary effect of the electric generating unit in accordance with the present invention.

FIGS. 2 and 3 are schematic diagrams showing an electric generating unit as a substitute for a vehicle battery in accordance with various embodiments of the present invention, FIG. 4 is a schematic diagram showing a structure of a diaphragm of the electric generating unit in accordance with various embodiments of the present invention, FIG. 5 is a schematic diagram showing the overall structure of the electric generating unit in accordance with various embodiments of the present invention, and FIG. 6 is a graph showing an effect of the electric generating unit in accordance with various embodiments of the present invention.

Referring to FIGS. 2 to 6, the electric generating unit as a substitute for a vehicle battery in accordance with various embodiments of the present invention comprises a housing 10 having a predetermined inner space therein, a fixed wafer 20 disposed on one side of the housing 10, and a diaphragm unit 30 being in contact with the fixed wafer 20 and capable of generating electrical energy by external vibration, pressure, or acoustic energy.

First, a plurality of diaphragms 30 is disposed to be spaced at a predetermined distance at the top of the fixed wafer 20, and each of the diaphragms 30 may have a rectangular or circular shape.

The diaphragm unit 30 comprises a silicon wafer 31, which is directly in contact with the top of the fixed wafer 20 and includes a mass unit 31a formed integrally on the center thereof so as to adjust the resonance frequency and generate a inertia to make a flexible deformation of the diaphragm unit 30, upper and lower electrodes 32 and 33, through which a current flows, provided at the top of the silicon wafer 31, and a piezoelectric element 34 disposed between the upper and lower electrodes 32 and 33 and capable of generating electricity by the action of mechanical stress of the piezoelectric element 34.

The mass unit 31a is formed during processing of the silicon wafer 31 by backside etching, and the size and thickness of the mass unit 31a can be adjusted according to a desired resonant frequency. The mass unit 31a may be formed into the same shape as the diaphragm unit 30.

The piezoelectric element 34 may comprise PZT(Pb(Ti,Zr)O3) with a Zr:Tr composition ratio of 52:48 that exhibits an excellent piezoelectric effect. The upper and lower electrodes 32 and 33 may be made of a platinum, gold, copper, or aluminum layer.

When forming the lower electrode 33 on the silicon wafer 31, a silicon oxide layer is formed on the surface of the silicon wafer 31. An intermediate layer is formed to increase the adhesion between the silicon oxide layer and the lower electrode 33, and the intermediate layer C may be made of titanium or chrome.

As shown in FIG. 4, when forming the diaphragm unit 30, a silicon-on-insulator (SOI) wafer bonded to a silicon oxide is used to obtain a uniform thickness. At this time, an oxide layer O is formed in the middle of the SOI wafer; however, it is removed after a sufficient etching time, thus obtaining a diaphragm having a uniform thickness.

Next, the fixed wafer 20 is formed of quartz glass or silicon material having hardness higher than that of the silicon wafer 31, and a plurality of holes 21, through which air passes, may be formed to be spaced at a predetermined distance therein.

The housing 10 comprises an upper housing 12 and a lower housing 11, and thereby an inner space in which the fixed wafer 20 and the diaphragm unit 30 are disposed is formed. On the lower housing 1, the fixed wafer 20 and the diaphragm unit 30 are placed, and the upper housing 12 covers the top of the diaphragm unit 30 and is connected to the lower housing 11.

Moreover, the housing 10 further includes a power conversion device 13 for converting alternating current output form the diaphragm unit 30 into direct current and storing the converted current.

The power conversion device 13 may be formed integrally with or separately from the lower housing 11, and it is formed integrally with the lower housing 11 in various embodiments of the present invention. The power conversion device 13 includes power terminals 13a connected thereto, and the power terminals 13a may be made of a copper alloy-tin plated material, brass, or bronze.

The connection between the diaphragm unit 30 and the power conversion device 13 and the connection between the power conversion device 13 and the power terminals 13a may be made by wires 13b.

The upper housing 12 includes a sound absorbing plate 12a to effectively absorb external acoustic energy. The sound absorbing plate 12a may be formed separately and then attached to the upper housing 12 or formed integrally with the upper housing 12, and it is formed integrally with the upper housing 12 in various embodiments of the present invention.

Moreover, the lower housing 11 includes a plurality of vent holes 11a, spaced at a predetermined distance, to control air pressure in the inner space of the housing 10 and thus prevent excessive amplitude from being generated in the diaphragm unit 30 and improve the durability.

As shown in FIG. 5, if the number and size of the vent holes 11a are appropriately adjusted, it is possible to prevent the diaphragm unit 30 from being excessively deformed by strong external vibration or acoustic energy with an appropriate pressure generated in the vent holes 11a by air passing through the vent holes 11a, thus suppressing the amplitude.

Lastly, the upper housing 12 and the lower housing 11 may be bonded to each other using epoxy for semiconductor or by ultrasonic fusion.

The structure and operation of the electric generating unit as a substitute for a vehicle battery in accordance with various embodiments of the present invention having the above-described construction will be described below.

First, when the lower housing 11 is provided, the fixed wafer 20 is disposed on one side of the lower housing 11. The fixed wafer 20 includes the holes 21 formed to be spaced at a predetermined distance so that air can pass therethrough.

The diaphragm unit 30 is disposed at the top of the fixed wafer 20, corresponding to the position of the hole 21.

The diaphragm unit 30 includes the silicon wafer 31, on which the mass unit 31a is formed integrally on the center thereof so as to adjust the resonance frequency, and the lower electrode 33 disposed at the top of the silicon wafer 31 and made of a platinum, gold, copper, or aluminum layer. The silicon wafer 31 and the lower electrode 33 are bonded to each other using titanium or chrome.

The piezoelectric element 34 of PZT is disposed on a surface of the lower electrode 33, which is not in contact with the silicon wafer 31, so as to generate electricity by the action of mechanical stress. The upper electrode 32 formed of the same material as the lower electrode 33 is disposed at the top of the piezoelectric element 34.

When the diaphragm unit 30 is formed at the top of the fixed wafer 20, the upper housing 12 covering the top of the diaphragm unit 30 and including the sound absorbing plate 12a, formed integrally therewith and capable of effectively absorbing external acoustic energy, is connected to the lower housing 11.

Meanwhile, the power conversion device 13 capable of converting alternating current output form the diaphragm unit 30 into direct current and storing the converted current is formed integrally with the lower housing 11.

The power terminals 13a made of brass or bronze are connected to the power conversion device 13, and the connection between the diaphragm unit 30 and the power conversion device 13 and the connection between the power conversion device 13 and the power terminals 13a are by the wires 13b.

In the above-described electric generating unit as a substitute for a vehicle battery in accordance with various embodiments of the present invention, when external vibration, pressure, or acoustic energy is delivered to the diaphragm unit 30, the diaphragm unit 30 is elastically deformed up and down to deform the piezoelectric element 34 provided in the diaphragm unit 30, and thereby electricity is generated between the upper and lower electrodes 32 and 33.

Moreover, as shown in FIG. 6, in the electric generating unit as a substitute for a vehicle battery in accordance with various embodiments of the present invention, when the (sound) pressure of acoustic energy is increased above 90 dB, the plastic deformation of the diaphragm unit 30 is prevented by the damping effect of air due to the vent holes 11a formed in the lower housing 11, and thereby the amount of generated electrical energy is not increased any more. As a result, the electric generating unit as a substitute for a vehicle battery has excellent durability without the risk of damaging the diaphragm unit 30 by an excessive sound pressure.

As described above, according to the electric generating unit of various embodiments of the present invention, in which a diaphragm including a piezoelectric element is provided to generate electricity by the action of mechanical stress using external vibration, pressure, or acoustic energy, it is possible to provide a small-sized electric generating unit, which can be used as a substitute for a vehicle battery and thus used for the operation of an electronic device for a tire pressure monitoring system (TPMS), for example, disposed on the outside such as a tire, and thereby it is possible to solve the problem that the battery should be replaced periodically.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electric generating unit as a substitute for a vehicle battery, the electric generating unit comprising:
    a housing including an air pressure control member to control air pressure in an inner space of the housing;
    at least a diaphragm unit configured to sufficiently fluidly-insulate the inner space of the housing from outside of the housing and flexibly deformable by an inertia applied by a mass unit according to an external force so as to generate electricity;
    wherein the diaphragm unit comprises:
        a silicon wafer supported by a fixed wafer formed in the housing,
    wherein the mass unit is formed substantially on a center of the silicon wafer;
        upper and lower electrodes provided at a top of the silicon wafer; and
        a piezoelectric element disposed between the upper and lower electrodes and configured to generate electricity by mechanical stress occurring from the flexible deformation of the piezoelectric element.

2. The electric generating unit of claim 1, wherein a sound absorbing plate is formed at the housing to absorb external acoustic energy.

3. The electric generating unit of claim 1, wherein the mass unit is integrally formed with the diaphragm unit.

4. The electric generating unit of claim 1, wherein the size and thickness of the mass unit are adjusted according to resonant frequency of the diaphragm unit.

5. The electric generating unit of claim 1, wherein the air pressure control member includes at least a vent hole formed at the housing and configured to fluidly communicate the inner space with the outside of the housing to control the air pressure in the inner space so as to prevent generation of excessive amplitude of the diaphragm unit and improve durability.

6. The electric generating unit of claim 1, further comprising a power conversion device converting a current generated from the diaphragm unit and storing the converted current, wherein the power conversion device includes power terminals connected to the power conversion device.

7. The electric generating unit of claim 1, wherein the piezoelectric element comprises PZT(Pb(Ti,Zr)O3) with a Zr:Tr composition ratio of approximately 52:approximately 48.

8. The electric generating unit of claim 1, wherein the upper and lower electrodes are made of a platinum, gold, copper, or aluminum.

9. The electric generating unit of claim 1, wherein the fixed wafer has hardness higher than that of the silicon wafer.

10. The electric generating unit of claim 1, wherein the fixed wafer is made of quartz glass or silicon material.

11. The electric generating unit of claim 1, wherein a silicon oxide layer is formed on upper and lower surfaces of the silicon wafer and configured to be removed after a predetermined time period of etching.

12. The electric generating unit of claim 11, wherein an intermediate layer is formed between the silicon oxide layer and one of the upper or lower electrode.

13. The electric generating unit of claim 12, wherein the intermediate layer is made of titanium or chrome.

14. The electric generating unit of claim 1, wherein the mass unit is formed by backside etching during processing of the silicon wafer.

15. The electric generating unit of claim 1, wherein the housing comprises:
    an lower housing on which the fixed wafer and the diaphragm unit are placed;
    an upper housing connected to the lower housing and covering top portion of the diaphragm unit; and
    a power conversion device converting a current generated from the diaphragm unit and storing the converted current.

16. The electric generating unit of claim 15, wherein the vent hole is disposed at the lower housing.

17. The electric generating unit of claim 15, wherein a sound absorbing plate is formed integrally with the upper housing to absorb external acoustic energy.

18. The electric generating unit of claim 15, wherein the power conversion device is formed integrally with the lower housing and comprises power terminals connected to the power conversion device.

* * * * *